R. C. BENNER AND H. F. FRENCH.
APPARATUS FOR PRODUCING SMOKE SCREENS.
APPLICATION FILED SEPT. 19, 1918.
1,336,557.
Patented Apr. 13, 1920.
2 SHEETS—SHEET 1.
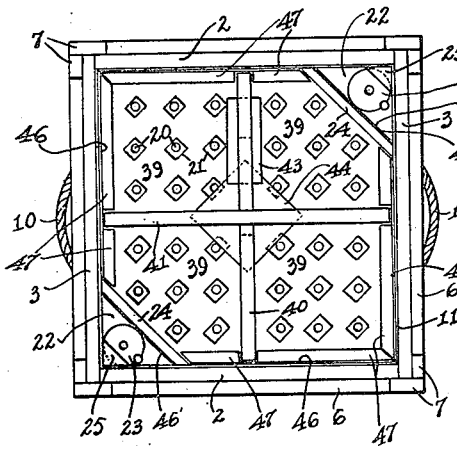
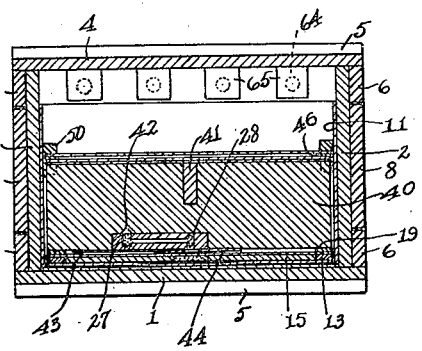
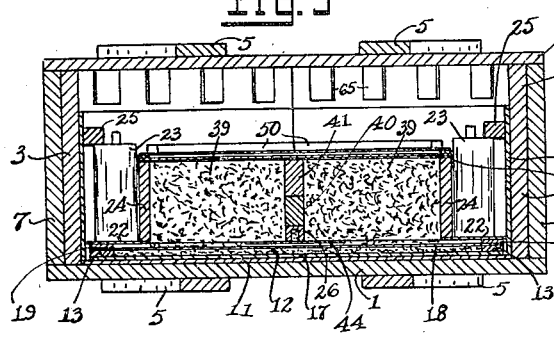
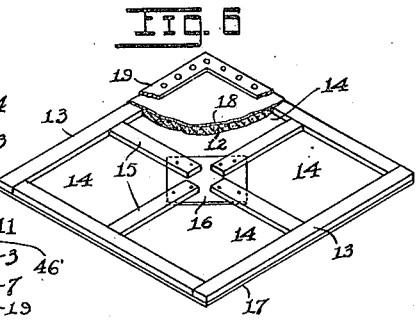
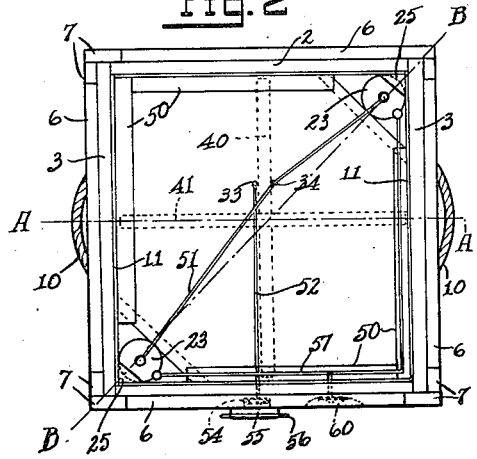
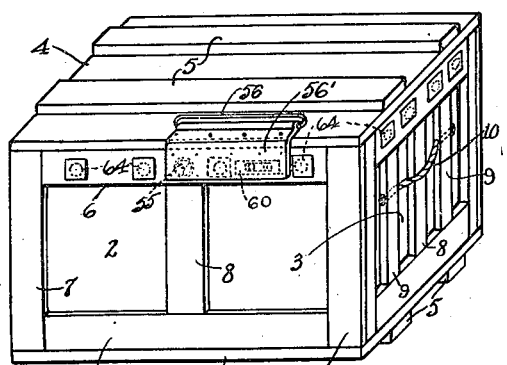
INVENTORS
R. C. BENNER
AND H. F. FRENCH
BY Ira J. Adams
ATTORNEY R. C. BENNER AND H. F. FRENCH.
APPARATUS FOR PRODUCING SMOKE SCREENS.
APPLICATION FILED SEPT. 19, 1918.
1,336,557.
Patented Apr. 13, 1920.
2 SHEETS—SHEET 2.
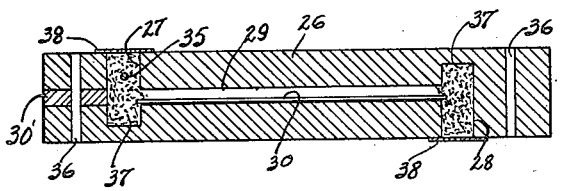
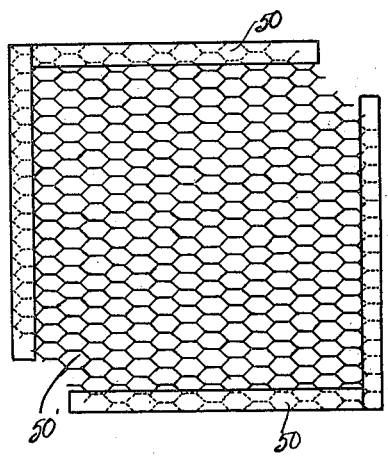
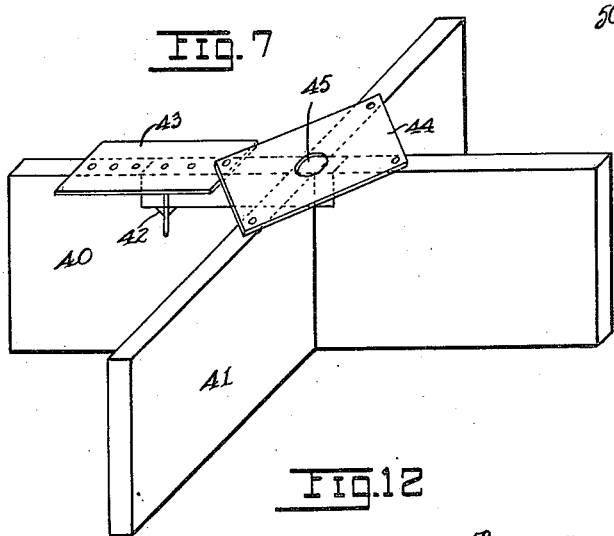
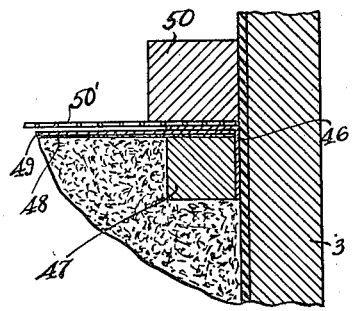
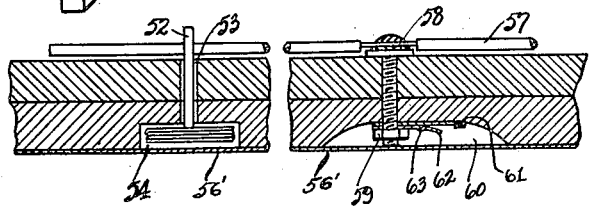
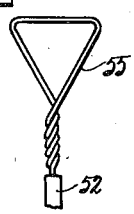
INVENTORS
R. C. BENNER
AND H. F. FRENCH
BY Ira J. Adams
ATTORNEY

UNITED STATES PATENT OFFICE.

RAYMOND C. BENNER AND HARRY F. FRENCH, OF FREMONT, OHIO, ASSIGNORS TO NATIONAL CARBON COMPANY, INC., A CORPORATION OF NEW YORK.

APPARATUS FOR PRODUCING SMOKE-SCREENS.

1,336,557.

Specification of Letters Patent.

Patented Apr. 13, 1920.

Application filed September 19, 1918. Serial No. 254,739.

*To all whom it may concern:*

Be it known that we, RAYMOND C. BENNER and HARRY F. FRENCH, citizens of the United States, and residents, respectively, of Fremont, in the county of Sandusky and State of Ohio, and Fremont, in the county of Sandusky and State of Ohio, have invented a certain new and useful Improvement in Apparatus for Producing Smoke-Screens, of which the following is a full, clear, and exact description.

This invention relates to smoke producers or "smoke boxes," especially designed for use in combatting submarine warfare. The effectiveness of smoke boxes in combating submarine warfare depends on producing a large volume of opaque smoke around the vessel, or between the submarine and the vessel, in order to render it invisible to the enemy. The vessel is thus rendered a poor target for torpedoes discharged at it and is enabled to elude the submarine.

The particular type of smoke box shown and described in the accompanying description and drawings is known as the "overboard" type and is placed in action upon being thrown overboard. The same smoke box could also be used on deck, but if intended for use in this manner certain slight modifications would usually be made.

The object of the present invention is to construct a device of reasonable cost, weight and size, which will quickly produce enormous volumes of opaque smoke.

Another object is to provide a device which may be placed in action in a simple manner.

Other objects and advantageous features of the invention will appear in the accompanying description and drawings in which:

Figure 1 is a cavalier projection of the completed smoke box.

Fig. 2 is a plan view with the cover removed.

Fig. 3 is a plan view before the smoke producing mixture has been placed in the box.

Fig. 4 is a cross section on the line A—A of Fig. 2.

Fig. 5 is a cross section on the diagonal line B—B of Fig. 2.

Fig. 6 is an isometric view of the starting mixture frame with portions removed.

Fig. 7 is a cavalier projection of the mixture partition in an inverted position.

Fig. 8 is a cross section of the ignition block.

Fig. 9 is a top view of the ignition block.

Fig. 10 is a fragmentary cross section showing the manner in which the smoke producing mixture is held in place.

Fig. 11 is a plan view of the frame placed on top of the smoke producing mixture.

Fig. 12 is a fragmentary section showing the electrical terminals of the device.

Fig. 13 is a detail of the stirrup forming one of the terminals.

As shown in Figs. 1 to 5, the general outline of the device is that of a rectangular box having a bottom 1, sides 2, 2 and 3, 3 and a top 4. The top and bottom each have a number of reinforcing cleats 5 and the sides are strengthened by strips 6 arranged around the top and bottom, corner pieces 7 and cleats 8 joining the top and bottom strips. The sides 3, 3 each have two extra cleats 9, 9 in which holes are bored for receiving the ends of rope handles 10, 10. The ends of the rope are knotted to prevent the rope from pulling out or the rope is otherwise fastened to the cleats. To waterproof the box, which is preferably made of white pine wood, it is coated or painted with several coats of waterproof paint, preferably an asphalt paint to make the box watertight. A lining 11 of asbestos board is tacked to the bottom and sides, extending up to within a few inches of the top.

On the bottom of the box we place about 3.8 lbs. of starting mixture in a layer 12 which consists preferably of one part of powdered charcoal to four parts of sodium nitrate by weight, although this may be varied. The mixture is inclosed in a wooden frame 13 (Fig. 6) divided into four spaces 14 by means of ribs 15 running from the sides of the frame toward the center and connected by a piece of sheet iron 16. The ends connected by the sheet iron do not run as far as the center so that some of the starting mixture is placed in the center. The bottom of the starting frame is covered with chipboard 17 tacked to the frame and the top is covered with a layer of cloth 18 fastened to the frame by means of tacks and strips of chipboard 19. When completed the starting mixture frame is placed in the bottom of the box with the cloth side up and the mixture is quilted to the bottom of the box as shown in Fig. 3 by means of short nails 20 having square pieces 21 of cardboard under the heads. This arrangement effectively prevents the starting mixture from shifting, which would produce non-uniform starting.

In diagonally opposite corners of the box two triangular pieces 22 of sheet metal are placed on top of the starting frame and on each of these a dry cell 23 is placed. Compartments are formed for the dry cells by means of partitions 24 which are nailed to the box and the dry cells are held in place in the compartments by triangular blocks 25 placed on top of the cells and nailed to the box.

An ignition block 26 (Figs. 8 and 9) will be placed on top of the starting mixture and consists of a small block of wood having two holes 27, 28 bored in it from opposite edges. The holes are connected by a passage 29 drilled through from one end. A strip of powder fuse 30 is placed in the passage 29 with an end protruding into each of the holes 27, 28. The open end of the hole 29 is then closed by a wooden plug 30'. On each side of the block copper strips 31, 32 are fastened near the hole 27 and wire leads 33, 34 are soldered to the copper strips 31, 32 respectively. A piece of resistance wire 35 passes through the hole 27 and the ends are soldered to the copper strips 31, 32. At each end of the block a small hole 36 is drilled to receive a nail for attaching the block in a manner which will be referred to later. The holes 27 and 28 are then each filled with about two grams of an ignition mixture 37 consisting of charcoal and potassium chlorate preferably in the proportion of one part of charcoal to ten parts of potassium chlorate by weight, though this may be varied. The mixture is held in place by pieces of paper 38 fastened to the block by means of shellac.

The interior of the box is divided into four compartments 39 by wooden partitions (Fig. 7) made up of two interfitting members 40, 41. One of the members 40 has a portion cut away along one edge which is adapted to receive the ignition block previously described. When inserted in the block the hole 28 lies exactly in the center of the outer edge and the other opening 27 adjoins the edge of member 40 which has a small notch 42 cut therein at the point where the hole 27 of the ignition block and the partition member 40 adjoin each other. The block placed in this position is fastened therein by nails hammered through the holes 36 into the partition. A rectangular piece of sheet metal 43 is tacked to the member 40 and the ignition block with its middle point approximately opposite the notch 42. A second piece of sheet metal 44, square in shape and having an opening 45 in the center, is tacked to the members 40 and 41 with the opening coinciding with the hole 28 of the ignition block. The leads 33, 34 are tacked to the member 40.

When the ignition block and partition are assembled as described the partition is placed in the box so that the hole 28 is adjacent the center of the starting mixture and the leads 33, 34 extend upward. The partition is then nailed to the box. On the inside of the box four oilcloth strips 46 are then tacked so that they extend a short distance above the top of the partition. Strips of oilcloth 46' are also tacked to the inside of the dry cell partitions 24. Cleats 47 are then nailed on top of the lower edge of the oilcloth strips 46 so that the upper edges are flush with the top of the partition.

The compartments for the smoke producing mixture are filled with a mixture consisting of hard pitch 1 part, antimony trisulfid 4 parts, sulfur 2½ parts, sodium nitrate 8 parts and ammonium chlorid 4½ parts, by weight. The pitch and sodium nitrate are ground to pass through a six mesh screen and the remaining materials are powdered. The mixture is covered with a cloth cover 48 and a chipboard cover 49 having small holes for the passage of the leads 33 and 34 therethrough. The oilcloth strips 46 and 46' are turned over the cloth and chipboard covers and tacked to the cleats 47. The mixture is thus prevented from sifting through at the edges. The top is further reinforced by a frame 50 having wire 50' tacked thereto, which is placed over the chipboard as shown in Fig. 10, and the frame 50 is nailed to the box.

The upper end of lead 34 is soldered to an intermediate point of a connecting wire 51 having its ends fastened to the carbon terminals of the dry cells. The upper end of lead 33 is soldered to a wire 52 which extends through a hole 53 and is coiled up in a circular depression in the side of the box 54. A triangular stirrup 55 is formed at the end of the wire 52 and fits in the depression 54. The zinc electrodes of the two dry cells are connected together by means of an L-shaped wire 57 and at an intermediate point is soldered to the head of a bolt 58 passing through the box. A spring clip is attached to the end of the bolt by means of a nut 59 and fits in a depression 60 in the side of the box. The clip may be formed by two strips of brass, one 61 fastened at the bottom of the depression and the other 62 being a spring member having a notch 63 adapted to cooperate with the first member to retain a conductor of the form of the stirrup.

Above the mixture partition a considerable vacant space exists and the sides of the box around this vacant space are provided with a number of openings 64. On the outside and inside these openings are covered with paper 65 which is first coated with shellac and dried. The depressions 54 and 60 for the stirrup 55 and spring clip are covered and protected when not intended to be used, by means of a piece of sheet metal 56 tacked to the box. The sheet metal member 56' terminates in a handle bent over the top of the box.

To place the box in action the operator grasps the handle 56 and pulls the covering 56' off the box to uncover the holes 54 and 60 and give access to the stirrup 55 and spring clip. This is very easily done as the metal is only tacked to the box. The stirrup is then removed from the depression and attached to the spring clip to close the electric circuit, the coil of wire in the depression serving as the connecting lead. The operator and an assistant each immediately grasp one of the rope handles 10 and swing the box overboard. The weight and volume of the box are so proportioned that it floats with the openings 64 above the surface of the water, and the center of gravity is sufficiently low to keep the box right side up.

As soon as the circuit is closed the resistance wire 35 becomes highly heated by the electric current supplied by two dry cells connected in parallel, and this ignites the readily inflammable ignition material in the hole 27. A highly combustible mixture is supplied by the charcoal and the potassium chlorate, as the latter decomposes very easily and supplies oxygen for the combustion of the charcoal. The thin paper 38 over the hole is burned away and the gases formed penetrate into the smoke producing mixture in the compartment above. The sheet metal plate 43 prevents the flame from reaching the starting mixture below, so that it is not ignited. However, if the starting mixture should happen to be prematurely ignited only one compartment would be started and only at one small point, so that the starting would be slow enough to permit the casting of the box overboard.

The combustion of the charcoal in the hole 27 is intended to ignite the powder fuse 30 which will propagate the fire to the charcoal and potassium chlorate in the hole 28. This action takes enough time to easily permit the box to be thrown overboard before any of the smoke producing action is started. The powder fuse ignites the material in hole 28 and quickly burns the paper over the hole and the combustion is imparted to the starting mixture directly under the hole and in the center where it can quickly spread to each of the spaces of the starting mixture. This mixture of charcoal and sodium nitrate also burns readily, although in small quantities it does not produce such a vigorous reaction as the charcoal and potassium chlorate in the ignition block. The amount of material in the starting frame is considerable and the reaction is sufficiently vigorous to start full smoke evolution almost instantaneously, but is not so violent as to produce an explosion. The sudden increase in the pressure inside the box blows out the paper sheets 65 pasted over the openings and the smoke then issues from the openings in enormous volume. Due to pressure inside the box, water cannot be splashed into it through the smoke holes.

An especially important feature of the present invention is the ignition of the smoke mixture from the bottom. This method of starting has proved to be very effective in producing quickly large volumes of smoke, and also gives a more uniform and certain reaction for a given period of time. The reaction starts so quickly that about 10 or 20 seconds after the circuit is closed large volumes of brownish white smoke issue from the holes and this continues quite uniformly for 15 or 20 minutes, and by suitable changes these periods may be varied over a wide range. The former, however, permits the box to be heaved overboard without inconvenience and the latter covers the period during which an overboard type of smoke box is useful.

The theory of operation of the smoke mixture is about as follows, though we are not limited to such explanation:—The heat from the burning of the pitch vaporizes the ammonium chlorid which is the main smoke ingredient, but if no other smoke material were used the vaporized ammonium chlorid would react with the sodium oxid produced in some amounts by the reaction between the sodium nitrate and pitch, which would produce free ammonia, sodium chlorid and water, none of which is a smoke producer. We have found that the formation of these materials is minimized by incorporating sulfur or a sulfur material in the smoke mixture, and prefer to use free sulfur and antimony trisulfid. These react with the other materials to produce good "smoke" materials. The principal ingredients in the smoke in the specific mixture used probably are ammonium chlorid, sulfid, sulfite and sulfate, and antimony chlorid, oxid and pentasulfid. The sulfur and antimony sulfid used also furnish heat in entering into the combination referred to, and therefore they have a double purpose.

There are various equivalents for the ingredients disclosed. One could use other powdered or granular carbonaceous material than pitch, and arsenic oxid, antimony trichlorid, etc., could be substituted for ammonium chlorid. Other oxygen carriers than sodium nitrate could also be employed, potassium nitrate for instance.

In case a darker colored smoke is desired the pitch or other carbonaceous material used will be in excess, so that incomplete combustion occurs. In fact, if black smoke is sought, pitch and sodium nitrate alone admirably fulfil the requirement provided the proportions are so manipulated as to get incomplete burning of the pitch.

By suitable changes the speed of the reaction may be varied as desired. By way of example, the speed of reaction between the smoke producing ingredients may be increased by increasing the proportion of heat forming materials and the main smoke forming materials. This is most readily accomplished by diminishing the ammonium chlorid content. The fuel consequently has less material to volatilize and therefore the production of smoke is more rapid, but naturally the duration of the production of smoke will be shortened by the reduction of the main smoke producing material.

Having described our invention, what we claim is:

1. In smoke producing devices, a composition adapted to react to produce smoke and means for heating said composition at the bottom thereof to start the reaction.

2. In smoke producing devices, a container, a smoke producing composition therein, and means placed under the composition adapted to ignite it at the bottom.

3. In smoke producing devices, a container, a starting mixture at the bottom of the container, a smoke producing composition above the starting mixture and means for igniting the starting mixture.

4. In smoke producing devices, a container, a starting mixture at the bottom of the container, an ignition mixture, a smoke producing composition above the starting mixture and means for igniting the ignition mixture.

5. In smoke producing devices, a container, a starting mixture at the bottom of the container consisting of a combustible material and an oxidizing material, a smoke producing material above the starting mixture and means for igniting the starting material.

6. In smoke producing devices, a container, a starting mixture at the bottom of the container consisting of charcoal and sodium nitrate, a smoke producing material above the starting mixture and means for igniting the starting mixture.

7. In smoke producing devices, a container, a starting mixture at the bottom of the container, an ignition mixture, a smoke producing composition above the starting mixture, a strip of electrical resistance wire passing through the ignition material and means for supplying electric current to the resistance wire to heat the wire and ignite the ignition material.

8. In smoke producing devices, a container, a starting mixture at the bottom of the container, an ignition mixture, a smoke producing composition above the starting mixture, a strip of electrical resistance wire passing through the ignition material and a dry cell adapted to be connected to the resistance wire to supply current thereto to heat the wire in the ignition material.

9. In smoke producing devices, a container, a starting mixture at the bottom of the container, a pair of compartments spaced apart adapted to receive ignition material, one of said compartments adjoining the starting mixture and the other being spaced therefrom, a piece of powder fuse connecting the two ignition compartments, means for igniting the material in the ignition compartment spaced from the starting mixture, and a smoke producing composition placed above the starting mixture.

10. In smoke producing devices, a container, a starting mixture at the bottom of the container, a pair of compartments spaced apart adapted to receive ignition material, one of said compartments adjoining the starting mixture and the other being spaced therefrom, a passageway connecting the two compartments, a piece of powder fuse in the passageway, a strip of electrical resistance wire in the compartment spaced from the starting mixture, means for supplying electric current to heat the resistance wire and ignite the ignition material, and a smoke producing composition above the starting mixture.

11. In smoke producing devices, a closed container having a plurality of openings near the top, means for covering the openings adapted to be broken by internal pressure in the container, a starting mixture in the bottom of the container, a smoke producing composition above the starting mixture and means for igniting the starting mixture.

12. In smoke producing devices, a box closed at the top and bottom and having a plurality of openings near the top, means over the openings of the box adapted to be broken by internal pressure in the box, a starting mixture in the bottom of the box, a dry cell, a pair of compartments spaced apart, one of said compartments adjoining the starting mixture and the other being spaced therefrom, an ignition material in each of the compartments, a passageway connecting the compartments, a piece of powder fuse in the passageway, a piece of electrical resistance wire in the compartment spaced from the starting mixture, a conductor connected to one end of the resistance wire and extending through the box, a second conductor attached to the other end of the resistance wire and connected to one terminal of the dry cell, and a lead extending through the box connected to the other terminal of the dry cell and having a binding post attached thereto, and a smoke producing mixture in the box above said starting mixture.

13. In smoke producing devices, a box closed at the top and bottom and having a plurality of openings near the top, means over the openings of the box adapted to be opened by internal pressure in the box, a starting mixture in the bottom of the box, a dry cell, a pair of compartments spaced apart, one of said compartments adjoining the starting mixture and the other being spaced therefrom, an ignition material in each of the compartments, a passageway connecting the compartments, a piece of powder fuse in the passageway, a piece of electrical resistance wire in the compartment spaced from the starting mixture, a pair of conductors, one connected to each end of the resistance wire, a lead from the dry cell connected to one of the conductors, a second lead from the dry cell extending through the box, a terminal attached thereto, a third lead extending through the box and adapted to be attached to the terminal to close the circuit, and a smoke producing mixture in the compartments.

14. In smoke producing devices, a box closed at the top and bottom and having a plurality of openings near the top, means over the openings of the box adapted to be broken by internal pressure in the box, a frame containing a starting mixture adapted to be fitted in the bottom of the box, a dry cell, a partition consisting of two intersecting members adapted to divide the box into four compartments, one of said members having two openings spaced apart, one of said openings adjoining the center of the starting frame mixture and the other being spaced therefrom, an ignition material in each of the openings, a passageway connecting the openings, a piece of powder fuse in the passageway, a piece of electrical resistance wire in the openings spaced from the starting mixture, a pair of conductors, one connected to each end of the resistance wire, a lead from the dry cell connected to one of the conductors, a second lead from the dry cell extending through the box, a terminal attached thereto, a third lead extending through the box and adapted to be attached to the terminal to close the circuit, removable means for covering said third lead before the circuit is closed, and a smoke producing mixture in the compartments.

15. In smoke producing devices, a box closed at the top and bottom and having a plurality of openings near the top, means over the openings of the box adapted to be broken by internal pressure in the box, a frame containing a starting mixture adapted to be fitted in the bottom of the box, a pair of compartments in opposite corners, a dry cell in each compartment, a partition consisting of two intersecting members adapted to divide the box into four compartments, one of said members having two openings spaced apart, one of said openings adjoining the center of the starting frame mixture and the other being spaced therefrom, an ignition material in each of the openings, a passageway connecting the openings, a piece of powder fuse in the passageway, a piece of resistance wire in the opening spaced from the starting mixture, a pair of conductors, one connected to each end of the resistance wire, lead connecting corresponding terminals of the dry cells and connected at an intermediate point to one of the conductors, a second lead connecting the other terminals of the dry cells and having a projection extending through the box, a terminal attached to the projection, a third lead extending through the box and adapted to be attached to the terminal to close the circuit, removable means for covering said third lead before the circuit is closed, and a smoke producing mixture in the compartments.

16. In smoke producing devices, a box closed at the top and bottom and having a plurality of openings around the sides near the top, a piece of paper pasted over the openings of the box adapted to be broken by internal pressure in the box, a frame containing a starting mixture adapted to be fitted in the bottom of the box, a pair of compartments in diagonally opposite corners, a dry cell in each compartment, a partition consisting of two intersecting members adapted to divide the box into four compartments, one of said members having two openings spaced apart, one of said openings adjoining the center of the starting frame mixture and the other being spaced therefrom, an ignition material in each of the openings, a passageway connecting the openings, a piece of powder fuse in the passageway, a piece of electrical resistance wire in the opening spaced from the starting mixture, a pair of conductors, one connected to each end of the resistance wire, a lead connecting corresponding terminals of the dry cells and connected at an intermediate point to one of the conductors, a second lead connecting the other terminals of the dry cells and having a projection extending through the box, a terminal attached to the projection, a third lead extending through the box and adapted to be attached to the terminal to close the circuit, removable means for covering said third mentioned lead before the circuit is closed, a smoke producing mixture in the compartments and a cover on top of said smoke producing mixture.

17. In smoke producing devices, a box closed at the top and bottom having a plurality of openings around the sides near the top, a piece of paper pasted over the openings on the inside of the box adapted to be broken by internal pressure in the box, a lining of asbestos on the inside of the box, a frame containing a starting mixture and adapted to be fitted in the bottom of the box, a pair of compartments in diagonally opposite corners, a dry cell in each compartment, a partition consisting of two intersecting members adapted to divide the lower portion of the box into four compartments, one of said members having two openings spaced apart, one of said openings adjoining the center of the starting frame mixture and the other being spaced therefrom, an ignition material in each of the openings, a passageway connecting the openings, a piece of powder fuse in the passageway, a piece of electrical resistance wire in the openings spaced from the starting mixture, a pair of conductors, one connected to each end of the resistance wire, a lead connecting corresponding terminals of the dry cells and connected at an intermediate point to one of the conductors, a second lead connected to the other terminals of the dry cells and having a projection extending through the box, a terminal attached to the projection, a third lead extending through the box and ending in a coil of wire adapted to be attached to the terminal to close the circuit, removable means for covering said coil before the circuit is closed, a smoke producing mixture in the compartments and a cover on top of said smoke producing mixture.

18. In smoke producing devices, a waterproof box closed at the top and having a plurality of openings around the sides near the top, a piece of paper pasted over the openings on the inside of the box adapted to be broken by internal pressure in the box, a lining of asbestos on the inside of the box, a frame having a top covering of cloth, said frame containing a starting mixture and being adapted to be fitted in the bottom of the box, a pair of compartments in diagonally opposite corners, a dry cell in each compartment, a partition consisting of two intersecting members adapted to divide the lower portion of the box into four compartments, one of said members having two openings spaced apart, one of said openings adjoining the center of the starting frame mixture and the other being spaced therefrom, an ignition material in each of the openings, a passageway connecting the openings, a piece of powder fuse in the passageway, a piece of resistance wire in the openings spaced from the starting mixture, a pair of conductors, one connected to each end of the resistance wire, a lead connecting the positive terminals of the dry cells and connected at an intermediate point to one of the conductors, a second lead connected to the negative terminals of the dry cells and having a projection extending through the box, a terminal attached to the projection, a third lead extending through the box and ending in a coil of wire adapted to be attached to the terminal to close the circuit, removable means for covering said coil before the circuit is closed, a smoke producing mixture in the compartments, and a cover on top of said smoke producing mixture.

19. In smoke producing devices, a waterproof rectangular wooden box closed at the top and bottom and having a plurality of openings around the sides near the top, a plurality of pieces of paper pasted over the openings on the inside of the box adapted to be broken by internal pressure in the box, a lining of asbestos on the inside of the box, a frame having a top covering of cloth, said frame containing a starting mixture consisting of charcoal and sodium nitrate and being adapted to be fitted in the bottom of the box, a pair of compartments in diagonally opposite corners, a dry cell in each compartment, a partition consisting of two intersecting members adapted to divide the lower portion of the box into four compartments, one of said members having two openings spaced apart, one of said openings adjoining the center of the starting frame mixture and the other being spaced therefrom, an ignition material consisting of charcoal and potassium chlorate in each of the openings, a passageway connecting the openings, a piece of powder fuse in the passageway, a piece of electric resistance wire in the openings spaced from the starting mixture, a pair of conductors, one connected to each end of the resistance wire, a lead connecting the positive terminals of the dry cells and connected at an intermediate point to one of the conductors, a second lead connecting the negative terminals of the dry cells and having a projection extending through the box, a terminal attached to the projection, a third lead extending through the box and ending in a coil of wire adapted to be attached to a terminal to close the circuit and removable means for covering said coil before the circuit is closed, a smoke producing mixture in the compartments and a cover on top of said smoke producing mixture.

In testimony whereof we hereunto affix our signatures.

RAYMOND C. BENNER.
HARRY F. FRENCH.